United States Patent
Szymanski et al.

(10) Patent No.: US 6,739,806 B1
(45) Date of Patent: May 25, 2004

(54) CEMENT COMPOSITIONS WITH IMPROVED FLUID LOSS CHARACTERISTICS AND METHODS OF CEMENTING IN SUBTERRANEAN FORMATIONS

(75) Inventors: Michael J. Szymanski, Duncan, OK (US); Larry S. Eoff, Duncan, OK (US); John Michael Wilson, Duncan, OK (US); Samuel J. Lewis, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/461,314

(22) Filed: Jun. 13, 2003

(51) Int. Cl.$^7$ .......................... E02D 29/00; C04B 24/00; C04B 24/02

(52) U.S. Cl. .................. 405/267; 106/694; 106/696; 106/706; 106/708; 106/719; 106/724; 106/727; 106/773; 106/778; 106/781; 106/802; 106/803; 106/808; 106/810; 106/823; 166/293; 166/295; 405/266; 507/204; 507/219; 507/239; 507/266; 524/4; 524/5; 524/404

(58) Field of Search .................. 106/694, 696, 106/706, 708, 719, 724, 727, 773, 778, 781, 802, 803, 808, 810, 823; 166/293, 295; 405/266, 267; 507/204, 219, 239, 266; 524/4, 5, 404

(56) References Cited

U.S. PATENT DOCUMENTS

| | | | |
|---|---|---|---|
| 2,576,955 A | 12/1951 | Ludwig | 260/29.6 |
| 3,132,693 A | 5/1964 | Weisend | 166/33 |
| 3,359,225 A | 12/1967 | Weisend | 260/29.6 |
| 4,011,909 A | 3/1977 | Adams et al. | 166/293 |
| 4,015,991 A | 4/1977 | Persinski et al. | 106/90 |
| 4,304,298 A | 12/1981 | Sutton | 166/293 |
| 4,340,427 A | 7/1982 | Sutton | 106/87 |
| 4,367,093 A | 1/1983 | Burkhalter et al. | 106/87 |
| 4,439,571 A * | 3/1984 | Dufour et al. | 524/183 |
| 4,450,010 A | 5/1984 | Burkhalter et al. | 106/87 |
| 4,515,635 A | 5/1985 | Rao et al. | 106/90 |
| 4,554,020 A | 11/1985 | Hollenberg | 106/90 |
| 4,555,269 A | 11/1985 | Rao et al. | 106/90 |
| 4,565,578 A | 1/1986 | Sutton et al. | 106/87 |
| 4,569,395 A | 2/1986 | Carpenter | 166/293 |
| 4,619,776 A * | 10/1986 | Mondshine | 507/211 |
| 4,676,317 A | 6/1987 | Fry et al. | 166/293 |
| 4,700,780 A | 10/1987 | Brothers et al. | 166/293 |
| 4,703,801 A | 11/1987 | Fry et al. | 166/293 |
| 4,766,959 A | 8/1988 | Allison | 166/295 |
| 4,806,164 A | 2/1989 | Brothers | 106/90 |
| 4,818,288 A | 4/1989 | Aignesberger et al. | 106/90 |
| 5,009,269 A | 4/1991 | Moran et al. | 166/293 |
| 5,105,885 A | 4/1992 | Bray et al. | 166/279 |
| 5,439,057 A * | 8/1995 | Weaver et al. | 166/295 |
| 5,594,050 A | 1/1997 | Audebert et al. | 524/5 |
| 5,680,900 A * | 10/1997 | Nguyen et al. | 166/295 |
| 5,728,210 A | 3/1998 | Moran et al. | 106/823 |
| 5,762,140 A * | 6/1998 | Hardy et al. | 166/295 |
| 5,850,880 A | 12/1998 | Moran et al. | 166/293 |
| 6,063,738 A | 5/2000 | Chatterji et al. | 507/269 |
| 6,156,808 A | 12/2000 | Chatterji et al. | 516/116 |
| 6,156,819 A * | 12/2000 | Lai et al. | 523/130 |
| 6,180,689 B1 | 1/2001 | Moulin | 523/130 |
| 6,268,406 B1 | 7/2001 | Chatterji et al. | 523/130 |
| 6,316,044 B2 | 11/2001 | Ottersbach et al. | 427/2.31 |
| 6,457,524 B1 | 10/2002 | Roddy | 166/293 |
| 6,516,883 B1 | 2/2003 | Chatterji et al. | 166/293 |
| 2003/0232895 A1 * | 12/2003 | Omidian et al. | 521/99 |
| 2003/0234105 A1 * | 12/2003 | Gupta et al. | 166/300 |

FOREIGN PATENT DOCUMENTS

EP            000705850 B1 * 4/1996

OTHER PUBLICATIONS

Halliburton brochure entitled "D–AIR 3000 and D–AIR 3000L Defoamers" Dated 1999.(no month).
Halliburton brochure entitled "CFR–3 Cement Friction Reducer" Dated 1998. (no month).
Halliburton brochure entitled "Spherelite Cement Additive" dated 1999. (no month).
Halliburton brochure entitled "MicroBond Expanding Additive for Cement" Dated 1999.(no month).
Halliburton brochure entitled "Super CBL Additive Cement Additive" Dated 1999.(no month).

* cited by examiner

*Primary Examiner*—Anthony J. Green
(74) *Attorney, Agent, or Firm*—Craig W. Roddy; Baker Botts L.L.P.

(57) ABSTRACT

The present invention provides cement compositions comprising an improved fluid loss control additive, and methods for cementing in a subterranean formation using such cement compositions. The cement compositions comprise a hydraulic cement, water, and a fluid loss control additive comprising at least two polymers connected by a pH-sensitive crosslink. Optionally, other ingredients may be included in the compositions.

104 Claims, No Drawings

CEMENT COMPOSITIONS WITH IMPROVED FLUID LOSS CHARACTERISTICS AND METHODS OF CEMENTING IN SUBTERRANEAN FORMATIONS

BACKGROUND OF THE INVENTION

1. Field of the Invention

The present invention relates to subterranean cementing operations, and more particularly, to fluid loss control additives for cement compositions, and methods of using cement compositions comprising such fluid loss control additives in subterranean formations.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

In order for such well cementing operations to be successful, the cement compositions utilized may include a fluid loss control additive to reduce the loss of fluid, e.g., water, from the cement compositions when they contact permeable subterranean formations and zones. Excessive fluid loss, inter alia, causes a cement composition to be prematurely dehydrated, which may limit the amount of cement composition that can be pumped, decrease the compressive strength of the cement composition and negatively impact bond strength between the set cement composition and a subterranean zone, the walls of pipe and/or the walls of the well bore.

Contemporary synthetic fluid loss control additives are large, water-soluble polymers. An example of such synthetic fluid loss control additive is a fluid loss control additive consisting of copolymers of acrylamide ("AA") and 2-acrylamido, 2-methyl propane sulfonic acid ("AMPS®"). However, certain AA/AMPS® copolymers are useful only in a limited number of operations, specifically those where the bottom hole circulating temperature ("BHCT") ranges from about 90° F. to about 125° F. The BHCT ranges encountered in subterranean operations often involve temperatures outside such a range. Also, certain of these copolymers have a salt tolerance of only up to about 10%, making certain of them unsuitable for applications involving cement compositions comprising salts.

The temperature limitations of certain AA/AMPS® copolymers are believed to be the result of hydrolysis of the amide groups. The carboxylate groups formed by such hydrolysis convert the copolymers to materials which retard the set time of the cement and reduce the compressive strength of the set cement. Further, in the lower portion of the above-mentioned temperature range (between about 90° F. to about 100° F.), certain AA/AMPS® copolymers are even less effective as a fluid loss control additive, requiring inclusion of larger amounts of such additive than at higher temperatures. The addition of such copolymers directly affects the rheology of the resultant cement composition, as copolymers of acrylamide and AMPS® exhibit high viscosity and poor mixability, thus the inclusion of a sufficiently large amount of fluid loss control additive to create a cement composition having an acceptable fluid loss often leads to viscosity and pumpability problems.

Additionally, synthetic polymers may not comply with environmental regulations in certain regions of the world. For example, the use of polyamide polymers in the North Sea is problematic. One possible cause of this difficulty is the high molecular weight of such synthetic polymers.

SUMMARY OF THE INVENTION

The present invention provides cement compositions which demonstrate improved fluid loss characteristics, and methods for cementing in a subterranean formation using such cement compositions.

One method of the present invention comprises the steps of providing a cement composition comprising a hydraulic cement, water, and a fluid loss control additive comprising at least two polymers connected by a pH-sensitive crosslink; placing the cement composition into the subterranean formation; and permitting the cement composition to set therein.

One embodiment of the cement compositions of the present invention comprises a hydraulic cement, water, and a fluid loss control additive comprising at least two polymers connected by a pH-sensitive crosslink. Optionally, other additives suitable for inclusion in cement compositions may be added.

The objects, features and advantages of the present invention will be readily apparent to those skilled in the art upon a reading of the description of the preferred embodiments, which follows.

DESCRIPTION OF PREFERRED EMBODIMENTS

The present invention provides cement compositions that have improved fluid loss characteristics and methods of using such cement compositions in subterranean formations. While the compositions and methods of the present invention are useful in a variety of subterranean applications, they are particularly useful for subterranean well completion and remedial operations, such as primary cementing, e.g., cementing casings and liners in well bores, including those in production wells, which include multi-lateral subterranean wells.

The cement compositions of the present invention generally comprise a hydraulic cement, water sufficient to form a pumpable slurry, and a fluid loss control additive of the present invention. The cement compositions of the present invention may range in density from about 4 lb/gallon to about 23 lb/gallon. In certain preferred embodiments, the density of the cement compositions may range from about 12 lb/gallon to about 17 lb/gallon. In certain other embodiments, the cement compositions can be low-density cement compositions, e.g., foamed cement compositions or cement compositions comprising other means to reduce their densities, e.g., microspheres.

Any cements suitable for use in subterranean applications are suitable for use in the present invention. In certain preferred embodiments, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, and high alkalinity cements. In certain preferred embodiments, the hydraulic cement is a Portland cement.

The cement compositions of the present invention further comprise water, which can be from any source provided that it does not contain an excess of compounds that adversely affect other compounds in the cement compositions. For example, a cement composition of the present invention can comprise fresh water, salt water (e.g., water containing one or more salts dissolved therein), brine (e.g., saturated salt water), or seawater. The water may be present in an amount sufficient to form a pumpable slurry. More particularly, the water is present in the cement compositions of the present invention in an amount in the range of from about 16% to about 220% by weight of cement ("bwoc") therein. In certain preferred embodiments, the water is present in the cement compositions in the range of from about 30% to about 70% bwoc therein.

The cement compositions of the present invention also comprise a fluid loss control additive of the present invention, present in the cement composition in an amount sufficient to provide a desired level of fluid loss control. More particularly, the fluid loss control additive may be present in the cement compositions of the present invention in an amount in the range of from about 0.1% to about 5.0% by weight of the water in the cement composition. In certain preferred embodiments, the fluid loss control additive is present in the cement composition in an amount in the range of from about 0.3% to about 1.4% by weight of the water in the cement composition.

Generally, the fluid loss control additives of the present invention comprise two or more polymers connected by a pH-sensitive crosslink, e.g., a borate ester of polyvinyl alcohol. The pH-sensitive crosslink between the polymers is achieved through the use of a polyvalent cation. Any polyvalent cation capable of connecting two or more polymer strands through a pH-sensitive crosslink may be suitable for use with the fluid loss control additives of the present invention. One of ordinary skill in the art with the benefit of this disclosure will recognize the appropriate polyvalent cation for use in a particular application. In certain preferred embodiments, the polyvalent cation comprises a Group IIIA element such as boron or aluminum, or a Group IVB element such as titanium or zirconium. As used, herein, the terms "Group IIIA element" and "Group IVB element" will be understood to mean those elements depicted as belonging to either Group IIIA or Group IVB, respectively, as shown on the periodic table of the elements found in the endpapers of John McMurry, *Organic Chemistry* (2d. ed. 1988). In certain preferred embodiments where the polyvalent cation comprises boron, any source of borate ion may be used with the fluid loss control additives of the present invention, including, inter alia, borax, sodium borate, or boric acid. An example of a suitable source of borate ion is reagent grade boric acid, commercially available from Sigma Aldrich, Inc., at various locations.

The pH-sensitive nature of the abovementioned crosslink, inter alia, may improve the degradability of the fluid loss control additives of the present invention. The pH-sensitive nature of the crosslink causes the crosslinked polymers to fall apart in a solution of water having a pH within a particular range, depending on the polyvalent cation used to make the crosslink. In certain preferred embodiments wherein the polyvalent cation comprises boron, the crosslinked polymers fall apart in a solution of water having a pH below about 9.2. A typical cement composition will have a pH ranging from about 9.2 to about 13. Accordingly, the pH-sensitive crosslink present in certain preferred embodiments of the fluid loss control additives of the present invention is substantially stable when placed in a typical cement composition. However, when the pH-sensitive crosslink present in such preferred embodiments is placed into a source of free water, e.g., seawater, the crosslink between a higher molecular weight polymer and a lower molecular weight polymer is broken, thus releasing into the seawater a lower molecular weight polymer that is more likely to biodegrade.

Generally, the polymers used in the fluid loss control additives of the present invention have a minimum molecular weight of at least about 1,000. In certain preferred embodiments, the polymers comprise multiple polymers differing widely in molecular weight, e.g., the molecular weight of a first polymer may differ from the molecular weight of a second polymer by at least 100%. In one preferred embodiment, one polymer has a molecular weight of at least 80,000, while another polymer has a molecular weight of less than about 8,000. In this preferred embodiment, the polymer having the greater molecular weight is present in the fluid loss control additive in an amount ranging from about 100% to about 500% of the presence of the polymer having the lesser molecular weight. In one preferred embodiment, the fluid loss control additive comprises a borate ester comprising a 1:1 mixture of polyvinyl alcohols of widely different molecular weights, e.g., a polyvinyl alcohol having a molecular weight of about 140,000 and a polyvinyl alcohol having a molecular weight of about 5,000.

The polymers used in the fluid loss control additives of the present invention may comprise the same chemical compound, or different chemical compounds. For example, generally speaking, the polymers may comprise polyalcohols such as 1,2 alcohols and 1,3 alcohols. Suitable 1,2 alcohols include, inter alia, polysaccharides, such as guar gum. Suitable 1,3 alcohols include, inter alia, polyvinyl alcohols. The polymers may also, comprise, inter alia, alpha hydroxy acids and 1,2 amines. In certain preferred embodiments, the polymers used in the fluid loss control additives of the present invention comprise polyvinyl alcohols. An example of a suitable polyvinyl alcohol is a polyvinyl alcohol having a molecular weight of about 5,000, commercially available from Cross World Sale Corporation, of Mohegan Lake, N.Y., under the tradename "ERKOL 03/140." Another example of a suitable polyvinyl alcohol is a polyvinyl alcohol having a molecular weight of about 140,000, commercially available from Cross World Sale Corporation, of Mohegan Lake, N.Y., under the tradename "ERKOL 40/140."

Generally, the fluid loss control additive of the present invention is made by dissolving one or more polymers in water; adding a polyvalent cation to the solution; and adjusting the pH as necessary to crosslink the polymers until the resulting solution achieves a desired molecular weight. One of ordinary skill in the art with the benefit of this disclosure will be able to identify suitable methods of measuring molecular weight of the solution, and will be able to recognize when a sufficient degree of crosslinking has been achieved. One such suitable method of detection is multi-angle light scattering HPLC.

The fluid loss control additives of the present invention may be added to the cement compositions of the present invention in a variety of ways. The dry cement, water and fluid loss control additive may be mixed in any order and given sufficient time to let the fluid loss control additive hydrate. The dry materials will typically swell when contacted with water; thus, an appropriate waiting period for hydration is typically a period of about 10 minutes after the end of visible swelling.

Optionally, the cement compositions of the present invention may be low-density cement compositions. For example, the cement compositions of the present invention may comprise foamed cement compositions. Where the cement composition is foamed, foaming agents and/or foam stabilizing agents, or mixtures thereof, may be included in the cement composition in order, inter alia, to facilitate the foaming and/or enhance the cement composition's stability. The foaming agent and/or foam stabilizing agent is generally present in the cement composition in an amount sufficient to provide a stable foamed cement composition. One of ordinary skill in the art with the benefit of this disclosure will recognize the appropriate type of foaming agent and/or foam stabilizing agent for use in a particular application, along with the amount in which such agent or agents should be incorporated.

Where the cement compositions of the present invention comprise foamed cement compositions, an expanding additive may be included in the cement composition. The expanding additive may be any component that enables a gas to become incorporated into the cement composition. Further, the addition of the expanding additive to the cement composition can be accomplished by any suitable method. In one preferred embodiment, the cement is foamed by direct injection of the expanding additive into the composition. For instance, where the cement composition is foamed by the direct injection of gas into the composition, the gas utilized can be air or any suitable inert gas, such as nitrogen, or even a mixture of such gases. In certain preferred embodiments, nitrogen is used. In other preferred embodiments, the cement is foamed by gas generated by a reaction between the cement slurry and an expanding additive present in the cement in particulate form. For example, the composition may be foamed by hydrogen gas generated in situ as the product of a reaction between the high pH slurry and fine aluminum powder present in the cement. Where an expanding additive in particulate form is used, aluminum powder, gypsum blends, and deadburned magnesium oxide are preferred. Preferred expanding additives comprising aluminum powder are commercially available under the tradenames "GAS-CHEK®" and "SUPER CBL" from Halliburton Energy Services, Inc., of Duncan, Okla.; a preferred expanding additive comprising a blend containing gypsum is commercially available under the tradename "MICROBOND" from Halliburton Energy Services, Inc., of Duncan, Okla.; and preferred expanding additives comprising deadburned magnesium oxide are commercially available under the tradenames "MICROBOND M" and "MICROBOND HT" from Halliburton Energy Services, Inc., of Duncan, Okla. Such preferred expanding additives are described in U.S. Pat. Nos. 4,304,298; 4,340,427; 4,367,093; 4,450,010 and 4,565,578, which are assigned to the assignee of the present application and are incorporated herein by reference. The amount of expanding additive present in the cement composition is that amount which is sufficient to incorporate a desired amount of a gas into the cement composition so that the cement composition has a density in the desired range. A density in the range of from about 4 to about 20 pounds per gallon is suitable. One of ordinary skill in the art with the benefit of this disclosure will recognize the proper amount of an expanding additive to use in order to provide a foamed cement composition having a desired density.

Another example of a low-density cement composition of the present invention is one that comprises microspheres. Any microspheres that are compatible with a subterranean cement composition, i.e., that are chemically stable over time upon incorporation into the cement, may be used. An example of a suitable microsphere is commercially available from Halliburton Energy Services, Inc., of Houston, Tex., under the tradename "SPHERELITE." Where included, the microspheres are present in the cement composition in an amount sufficient to provide a cement composition having a density in a desired range. More particularly, the microspheres may be present in the cement composition in an amount in the range of from about 10% to about 150% by weight of the cement. The microspheres may be added to the cement composition by any suitable method including by dry blending with the cement before the addition of a fluid such as water, by mixing with the fluid to be added to the cement, or by mixing with the cement slurry consecutively with or after the addition of the fluid. The microspheres may be pre-suspended in water and injected into the cement mix fluid or into the cement slurry as an aqueous slurry.

As will be recognized by those skilled in the art, the cement compositions of this invention also can include additional suitable additives, including, inter alia, accelerants, set retarders, defoamers, weighting materials, dispersants, vitrified shale, fly ash, and/or formation conditioning agents. One of ordinary skill in the art with the benefit of this disclosure will recognize the proper additives to be used in a particular application, along with the proper amounts. Although all of these additives are suitable, it has been found that additives comprising strong sulfonates may not be the most suitable for use in conjunction with the cement compositions of the present invention, as they tend to cause the cement composition to prematurely gel.

An example of a cement composition of the present invention comprises Class H Portland cement, 0.5% "CFR-3" dispersant by weight of the cement, 0.5% "D-AIR 3000" defoamer by weight of the cement, 1.0% of a fluid loss control additive of the present invention comprising a borate ester of polyvinyl alcohols by weight of the cement, and 47.5% water by weight of the cement. CFR-3 is a dispersant commercially available from Halliburton Energy Services, Inc., of Duncan, Okla. D-AIR 3000 is a defoamer commercially available from Halliburton Energy Services, Inc., of Duncan, Okla.

A method of the present invention comprises providing a cement composition that comprises a hydraulic cement, water sufficient to form a pumpable slurry, and a fluid loss control additive of the present invention; placing this cement composition in a subterranean formation; and permitting the cement composition to set therein.

To facilitate a better understanding of the present invention, the following examples of some of the preferred embodiments are given. In no way should such examples be read to limit the scope of the invention.

EXAMPLE 1

A sample fluid loss control additive of the present invention was prepared by adding 170 grams of ERKOL 40/140 S polyvinyl alcohol to 2 liters of water, and mixing the resulting solution at 170° F. until the polyvinyl alcohol was fully dissolved. Next, 180 grams of ERKOL 03/140 polyvinyl alcohol was added, along with 500 mL of water, and mixed at 170° F. until fully dissolved. Subsequently, a 250 mL solution of saturated boric acid (e.g., containing 15.9 grams boric acid) was added. The pH of the solution was then adjusted by slowly adding 225 mL of a 5 M solution of NaOH, with vigorous mixing, until the solution turned from a viscous mixture into a homogeneous crumbly gel. One liter of acetone was added, and the composition was allowed to stand for one hour. After the one hour had elapsed, the liquid was decanted. The addition of acetone, the one hour waiting period, and the decanting of the free liquid were all repeated three more times in order to remove the water from the gel. The remaining volatiles were then removed with a high vacuum pump. The resulting dry gel was then ground into a powder.

A sample cement composition was prepared by mixing 1,600 grams Class H Portland cement, 0.5% D-AIR 3000 defoamer by weight of the cement, 0.5% CFR-3 dispersant by weight of the cement, and 1.0% of the abovementioned fluid loss control additive of the present invention by weight of the cement, with 47.5% water by weight of the cement. Specifically, the water was added to the fluid loss control additive, and mixed for one hour, then the cement and other additives were added to the aqueous mixture and mixed under conditions set forth in API 10B. A fluid loss test was then performed on the sample composition at 130° F. in accordance with API 10B. The API 10B fluid loss was determined to be 27 mL.

As developers of fluid loss control additives commonly target an API 10B fluid loss measurement below at least about 100 mL, the above example demonstrates that the fluid loss control additives of the present invention provide an improved level of fluid loss control.

EXAMPLE 2

A fluid loss control additive of the present invention was prepared according to the procedure described in Example 1. A sample cement composition was prepared in a manner similar to that described in Example 1, except that the sample cement composition of Example 2 comprised 800 grains Class H Portland cement, 0.5% D-AIR 3000 defoamer by weight of the cement, 2.0% CFR-3 dispersant by weight of the cement, 2.0% of the abovementioned fluid loss control additive of the present invention by weight of the cement, and 56.5% water by weight of the cement. A fluid loss test was then performed on the sample composition at 180° F. in accordance with API 10B. The API 10B fluid loss was determined to be 17 mL.

As developers of fluid loss control additives commonly target an API 10B fluid loss measurement below at least about 100 mL, the above example demonstrates that the fluid loss control additives of the present invention provide a desirable level of fluid loss control.

EXAMPLE 3

A fluid loss control additive of the present invention was prepared according to the procedure described in Example 1. A sample cement composition was prepared in a manner similar to that described in Example 1, except that the sample cement composition of Example 3 comprised 800 grams Class H Portland cement, 1.0% D-AIR 3000 defoamer by weight of the cement, 1.0% CFR-3 dispersant by weight of the cement, 2.0% of the abovementioned fluid loss control additive of the present invention by weight of the cement, and 54.5% water by weight of the cement. A fluid loss test was then performed on the sample composition at 230° F. in accordance with API 10B. The API 10B fluid loss was determined to be 12 mL.

As developers of fluid loss control additives commonly target an API 10B fluid loss measurement below at least about 100 mL, the above example demonstrates that the fluid loss control additives of the present invention provide a desirable level of fluid loss control.

EXAMPLE 4

A fluid loss control additive of the present invention was prepared according to the procedure described in Example 1. Four sample cement compositions were prepared, comprising 800 grams Class H Portland cement, 42% water by weight of the cement, and different amounts of the fluid loss control additive of the present invention. The fluid loss control additive was mixed with water, and permitted to hydrate for an excessive time, e.g., about 58 hours. Then, the dry cement was added to the aqueous mixture, and conditioned at 80° F. by placement of the slurry into a preheated consistometer cup followed by continuous stirring at temperature for about 20 minutes. An API 10B fluid loss test was then performed on each sample cement composition at 80° F. The results are depicted in Table 1 below.

TABLE 1

|  | % FLUID LOSS CONTROL ADDITIVE BY WEIGHT OF CEMENT | API 10B FLUID LOSS (mL) |
|---|---|---|
| Sample Cement Composition No. 1 | 0.375% | 38 |
| Sample Cement Composition No. 2 | 0.5% | 55 |
| Sample Cement Composition No. 3 | 0.625% | 22 |
| Sample Cement Composition No. 4 | 0.75% | 26 |

As developers of fluid loss control additives commonly target an API 10B fluid loss measurement below at least about 100 mL, the above example demonstrates that the fluid loss control additives of the present invention provide a desirable level of fluid loss control.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation comprising the steps of:
   providing a cement composition comprising a hydraulic cement, water, and a fluid loss control additive comprising at least a first and a second polymer connected by a pH-sensitive crosslink;
   placing the cement composition into the subterranean formation; and
   permitting the cement composition to set therein.

2. The method of claim 1 wherein the hydraulic cement comprises Portland cements, pozzolanic cements, gypsum cements, high alumina content cements, silica cements, or high alkalinity cements.

3. The method of claim 1 wherein the fluid loss control additive is present in the cement composition in an amount sufficient to provide a level of fluid loss control.

4. The method of claim 1 wherein the fluid loss control additive is present in the cement composition in an amount in the range of from about 0.1% to about 5.0% by weight of the water in the cement composition.

5. The method of claim 1 wherein one of the polymers comprises a polyalcohol, an alpha hydroxy acid, or a 1,2 amine.

6. The method of claim 5 wherein the polyalcohol comprises a 1,2 alcohol, a 1,3 alcohol, or a mixture thereof.

7. The method of claim 1 wherein the first or second polymer has a molecular weight of at least about 1,000.

8. The method of claim 1 wherein the first and second polymers have different molecular weights.

9. The method of claim 8 wherein the molecular weight of the first polymer is less than about 8,000.

10. The method of claim 8 wherein the molecular weight of the second polymer is greater than about 80,000.

11. The method of claim 8 wherein the molecular weight of the first polymer differs from that of the second polymer by more than 100%.

12. The method of claim 8 wherein the first polymer comprises a lower molecular weight polymer, wherein the second polymer comprises a higher molecular weight polymer, and wherein the second polymer is present in the fluid loss control additive in an amount in the range of from about 1 to about 5 times the amount of the first polymer.

13. The method of claim 5 wherein the polyalcohol comprises a polyvinylalcohol.

14. The method of claim 1 wherein the first and second polymers are crosslinked through a polyvalent cation.

15. The method of claim 14 wherein the polyvalent cation comprises a Group IIIA element.

16. The method of claim 15 wherein the Group IIIA element is boron or aluminum.

17. The method of claim 16 wherein the pH-sensitive crosslink comprises a borate ester connecting the first and second polymers.

18. The method of claim 14 wherein the polyvalent cation comprises a Group IVB element.

19. The method of claim 18 wherein the Group IVB element is zirconium or titanium.

20. The method of claim 1 wherein the pH-sensitive crosslink breaks at a pH below about 9.2.

21. The method of claim 1 wherein the cement composition further comprises a weighting agent, a defoamer, microspheres, a surfactant, mica, bentonite, fumed silica, a salt, vitrified shale, fly ash, a dispersant, a retardant or an accelerant.

22. The method of claim 1 wherein the water is present in the cement composition in an amount in the range of from about 16% to about 220% by weight of the cement.

23. The method of claim 1 wherein the cement composition has a density in the range of from about 4 pounds per gallon to about 23 pounds per gallon.

24. The method of claim 1 wherein the cement composition further comprises an expanding additive.

25. The method of claim 24 wherein the expanding additive is a gas.

26. The method of claim 24 wherein the expanding additive is a particulate.

27. The method of claim 25 wherein the expanding additive comprises nitrogen, air or a mixture thereof.

28. The method of claim 27 comprising the additional step of foaming the cement composition before placing the cement composition into the subterranean formation.

29. The method of claim 26 wherein the expanding additive comprises an aluminum powder, gypsum, or dead-burned magnesium oxide.

30. The method of claim 29 comprising the additional step of:
   allowing a reaction to occur within the cement composition, wherein the reaction involves at least one component of the cement composition, and the reaction generates a gas within the cement composition before the cement composition develops substantial compressive strength, such additional step occurring after the cement composition has been placed in the subterranean formation.

31. The method of claim 24 wherein the cement composition further comprises a foaming agent and/or a foam stabilizing agent.

32. The method of claim 1 wherein the fluid loss control additive is present in the cement composition in an amount in the range of from about 0.3% to about 1.4% by weight of the water in the cement composition; wherein the first and second polymers comprise polyvinyl alcohols; wherein the pH-sensitive crosslink comprises a borate ester of the polyvinyl alcohols; wherein the polyvinyl alcohols comprise a first polyvinyl alcohol having a molecular weight of about 5,000 and a second polyvinyl alcohol having a molecular weight of about 140,000; wherein the second polyvinyl alcohol is present in the fluid loss control additive in an amount in the range of from about 1.0 to about 1.5 times the amount of the first polyvinyl alcohol; and wherein the water is present in the cement composition in an amount in the range of from about 30% to about 70% by weight of the cement.

33. A method of reducing the fluid loss of a cement composition, comprising the step of adding a fluid loss control additive to the cement composition, the fluid loss control additive comprising at least a first and a second polymer connected by a pH-sensitive crosslink.

34. The method of claim 33 wherein the cement composition comprises Portland cements, pozzolanic cements, gypsum cements, high alumina content cements, silica cements or high alkalinity cements.

35. The method of claim 33 wherein the fluid loss control additive is present in the cement composition in an amount sufficient to provide a level of fluid loss control.

36. The method of claim 33 wherein the fluid loss control additive is present in the cement composition in an amount in the range of from about 0.1% to about 5% by weight of the water in the cement composition.

37. The method of claim 33 wherein one of the polymers comprises a polyalcohol, an alpha hydroxy acid, or a 1,2 amine.

38. The method of claim 37 wherein the polyalcohol comprises a 1,2 alcohol, a 1,3 alcohol, or a mixture thereof.

39. The method of claim 33 wherein the first or second polymer has a molecular weight of at least about 1,000.

40. The method of claim 33 wherein the first and second polymers have different molecular weights.

41. The method of claim 40 wherein the molecular weight of the first polymer is less than about 8,000.

42. The method of claim 40 wherein the molecular weight of the second polymer is greater than about 80,000.

43. The method of claim 40 wherein the molecular weight of the first polymer differs from that of the second polymer by more than 100%.

44. The method of claim 40 wherein the first polymer comprises a lower molecular weight polymer, wherein the second polymer comprises a higher molecular weight polymer, and wherein the second polymer is present in the fluid loss control additive in an amount in the range of from about 1 to about 5 times the amount of the first polymer.

45. The method of claim 37 wherein the polyalcohol comprises a polyvinylalcohol.

46. The method of claim 33 wherein the first and second polymers are crosslinked through a polyvalent cation.

47. The method of claim 46 wherein the polyvalent cation is a Group IIIA element.

48. The method of claim 47 wherein the Group IIIA element comprises boron or aluminum.

49. The method of claim 48 wherein the pH-sensitive crosslink comprises a borate ester connecting the first and second polymers.

50. The method of claim 46 wherein the polyvalent cation is a Group IVB element.

51. The method of claim 50 wherein the Group IVB element comprises titanium or zirconium.

52. The method of claim 33 wherein the pH-sensitive crosslink breaks at a pH below about 9.2.

53. The method of claim 33 wherein the cement composition further comprises a weighting agent, microspheres, a defoamer, a surfactant, mica, bentonite, fumed silica, a salt, vitrified shale, fly ash, a dispersant, a retardant or an accelerant.

54. The method of claim 33 wherein the water is present in the cement composition in an amount in the range of from about 16% to about 220% by weight of the cement.

55. The method of claim 33 wherein the cement composition has a density in the range of from about 4 to about 23 pounds per gallon.

56. The method of claim 33 wherein the cement composition further comprises an expanding additive.

57. The method of claim 56 wherein the expanding additive is a particulate.

58. The method of claim 57 wherein the expanding additive comprises gypsum, deadburned magnesium oxide, or an aluminum powder.

59. The method of claim 56 wherein the expanding additive is a gas.

60. The method of claim 59 wherein the expanding additive comprises nitrogen, air or a mixture thereof.

61. The method of claim 56 wherein the cement composition further comprises a foam stabilizing agent and/or a foaming agent.

62. The method of claim 33 wherein the fluid loss control additive is present in the cement composition in an amount in the range of from about 0.3% to about 1.4% by weight of the water in the cement composition; wherein the first and second polymers comprise polyvinyl alcohols; where the pH-sensitive crosslink comprises a borate ester of the polyvinyl alcohols; wherein the polyvinyl alcohols comprise a first polyvinyl alcohol having a molecular weight of about 5,000 and a second polyvinyl alcohol having a molecular weight of greater than about 140,000; wherein the second polyvinyl alcohol is present in the fluid loss control additive in an amount in the range of from about 1 to about 1.5 times the amount of the first polyvinyl alcohol, and wherein the water is present in the cement composition in an amount in the range of from about 30% to about 70% by weight of the cement.

63. A cement composition comprising a hydraulic cement, water, and at least a first and a second polymer connected by a ph-sensitive crosslink.

64. The cement composition of claim 63 wherein the hydraulic cement, comprises Portland cements, pozzolanic cements, gypsum cements, high alumina content cements, silica cements or high alkalinity cements.

65. The cement composition of claim 63 wherein the fluid loss control additive is present in the cement composition in an amount sufficient to provide a level of fluid loss control.

66. The cement composition of claim 63 wherein the fluid loss control additive is present in the cement composition in an amount in the range of from about 0.1% to about 5% by weight of the water in the cement composition.

67. The cement composition of claim 63 wherein one of the polymers comprises a polyalcohol, an alpha hydroxy acid, or a 1,2 amine.

68. The cement composition of claim 67 wherein the polyalcohol comprises a 1,2 alcohol, a 1,3 alcohol, or a mixture thereof.

69. The cement composition of claim 63 wherein the first or second polymer has a molecular weight of at least about 1,000.

70. The cement composition of claim 63 wherein the first and second polymers have different molecular weights.

71. The cement composition of claim 70 wherein the molecular weight of the first polymer is less than about 8,000.

72. The cement composition of claim 70 wherein the molecular weight of the second polymer is greater than about 80,000.

73. The cement composition of claim 70 wherein the molecular weight of the first polymer differs from that of the second polymer by more than 100%.

74. The cement composition of claim 70 wherein the first polymer comprises a lower molecular weight polymer, wherein the second polymer comprises a higher molecular weight polymer, and wherein the second polymer is present in the fluid loss control additive in an amount in the range of from about 1 to about 5 times the amount of the first polymer.

75. The cement composition of claim 67 wherein the polyalcohol comprises a polyvinylalcohol.

76. The cement composition of claim 63 wherein the first and second polymers are crosslinked through a polyvalent cation.

77. The cement composition of claim 76 wherein the polyvalent cation is a Group IIIA element.

78. The cement composition of claim 77 wherein the Group IIIA element comprises boron or aluminum.

79. The cement composition of claim 78 wherein the pH-sensitive crosslink comprises a borate ester connecting the first and second polymers.

80. The cement composition of claim 76 wherein the polyvalent cation is a Group IVB element.

81. The cement composition of claim 80 wherein the Group IVB element comprises titanium or zirconium.

82. The cement composition of claim 63 wherein the pH-sensitive crosslink breaks at a pH below about 9.2.

83. The cement composition of claim 63 wherein the cement composition further comprises a weighting agent, a defoamer, microspheres, a surfactant, mica, bentonite, fumed silica, a salt, vitrified shale, fly ash, a dispersant, an expanding additive, a retardant or an accelerant.

84. The cement composition of claim 63 wherein the water is present in the cement composition in an amount in the range of from about 16% to about 220% by weight of the cement.

85. The cement composition of claim 63 wherein the cement composition has a density in the range of from about 4 pounds per gallon to about 23 pounds per gallon.

86. The cement composition of claim 63 wherein the fluid loss control additive is present in the cement composition in an amount in the range of from about 0.3% to about 1.4% by weight of the water in the cement composition; wherein the first and second polymers comprise polyvinyl alcohols; wherein the pH-sensitive crosslink comprises a borate ester of the polyvinyl alcohols; wherein the polyvinyl alcohols comprise a first polyvinyl alcohol having a molecular weight of about 5,000 and a second polyvinyl alcohol having a molecular weight of about 140,000; wherein the second polyvinyl alcohol is present in the fluid loss control additive in an amount in the range of from about 1 to about 1.5 times the amount of the first polyvinyl alcohol; and wherein the water in present in the cement composition in an amount in the range of from about 30% to about 70% by weight of the cement.

87. A fluid loss control additive for use in cement compositions, the fluid loss control additive comprising at least a first and a second polymer connected by a pH-sensitive crosslink.

88. The fluid loss control additive of claim 87 wherein one of the polymers comprises a polyalcohol, an alpha hydroxy acid, or a 1,2 amine.

89. The fluid loss control additive of claim 88 wherein the polyalcohol comprises a 1,2 alcohol, a 1,3 alcohol, or a mixture thereof.

90. The fluid loss control additive of claim 87 wherein first or second polymer has a molecular weight of at least about 1,000.

91. The fluid loss control additive of claim 87 wherein the first and second polymers have different molecular weights.

92. The fluid loss control additive of claim 91 wherein the molecular weight of the first polymer is less than about 8,000.

93. The fluid loss control additive of claim 91 wherein the molecular weight of the second polymer is greater than about 80,000.

94. The fluid loss control additive of claim 91 wherein the molecular weight of the first polymer differs from that of the second polymer by more than 100%.

95. The fluid loss control additive of claim 91 wherein the first polymer comprises a lower molecular weight polymer, wherein the second polymer comprises a higher molecular weight polymer, and wherein the second polymer is present in the fluid loss control additive in an amount in the range of from about 1 to about 5 times the amount of the first polymer.

96. The fluid loss control additive of claim 88 wherein the polyalcohol comprises a polyvinylalcohol.

97. The fluid loss control additive of claim 87 wherein the first and second polymers are crosslinked through a polyvalent cation.

98. The fluid loss control additive of claim 97 wherein the polyvalent cation is a Group IIIA element.

99. The fluid loss control additive of claim 98 wherein the Group IIIA element comprises boron or aluminum.

100. The fluid loss control additive of claim 99 wherein the pH-sensitive crosslink comprises a borate ester connecting the first and second polymers.

101. The fluid loss control additive of claim 97 wherein the polyvalent cation is a Group IVB element.

102. The fluid loss control additive of claim 101 wherein the Group IVB element comprises titanium or zirconium.

103. The fluid loss control additive of claim 87 wherein the pH-sensitive crosslink breaks at a pH below about 9.2.

104. The fluid loss control additive of claim 87 wherein the first and second polymers comprise polyvinyl alcohols; wherein the pH-sensitive crosslink comprises a borate ester of the polyvinyl alcohols; wherein the polyvinyl alcohols comprise a first polyvinyl alcohol having a molecular weight of about 5,000 and a second polyvinyl alcohol having a molecular weight of about 140,000; and wherein the second polyvinyl alcohol is present in the fluid loss control additive in an amount in the range of from about 1 to about 1.5 times the amount of the first polyvinyl alcohol.

* * * * *